(12) United States Patent
Svensen et al.

(10) Patent No.: US 8,998,447 B2
(45) Date of Patent: Apr. 7, 2015

(54) ILLUMINATION DEVICES USING ARRAY OF REFLECTORS

(71) Applicant: Projectiondesign AS, Gamle Fredrikstad (NO)

(72) Inventors: Oyvind Svensen, Ski (NO); Kjell Einar Olsen, Krakeroy (NO); Sverre Lefsaker, Vesteroy (NO); Tobby Simonsen, Gamle Fredrikstad (NO); Ronny Bjomsen, Krakeroy (NO)

(73) Assignee: Projectdesign AS, Gamle Fredrikstad (NO)

( * ) Notice: Subject to any disclaimer, the term of this patent is extended or adjusted under 35 U.S.C. 154(b) by 258 days.

(21) Appl. No.: 13/627,636

(22) Filed: Sep. 26, 2012

(65) Prior Publication Data

US 2014/0085888 A1 Mar. 27, 2014

(51) Int. Cl.
F21V 7/05 (2006.01)
F21V 7/00 (2006.01)
G02B 17/00 (2006.01)

(52) U.S. Cl.
CPC ............ F21V 7/0083 (2013.01); G02B 17/006 (2013.01)

(58) Field of Classification Search
CPC ... F21V 7/0083; F21V 7/0025; G02B 17/002; G02B 17/006; G03B 21/28; G03B 21/2066
USPC ................. 362/241, 243, 245, 247, 297, 346; 353/51, 73, 99; 359/627, 629, 855
See application file for complete search history.

(56) References Cited

U.S. PATENT DOCUMENTS

| 2,983,183 | A | 5/1961 | Pickering |
| 5,619,284 | A | 4/1997 | Magocs |
| 6,765,727 | B1 | 7/2004 | Chang |
| 7,434,945 | B2 * | 10/2008 | Maeda et al. ................... 353/99 |
| 7,959,297 | B2 * | 6/2011 | Silverstein et al. ............. 353/31 |
| 8,132,919 | B2 * | 3/2012 | Harland et al. ................. 353/31 |
| 8,167,440 | B2 * | 5/2012 | Sato et al. ....................... 353/99 |
| 8,235,536 | B2 | 8/2012 | Andersen et al. |
| 8,690,343 | B2 * | 4/2014 | Tanaka ............................ 353/31 |
| 8,749,898 | B2 * | 6/2014 | Minano et al. ................ 359/729 |
| 2007/0242230 | A1 | 10/2007 | Chen et al. |
| 2009/0091712 | A1 | 4/2009 | Lee et al. |
| 2009/0153752 | A1 | 6/2009 | Silverstein |
| 2012/0133903 | A1 | 5/2012 | Tanaka |

FOREIGN PATENT DOCUMENTS

| EP | 1538832 A2 | 6/2005 |
| JP | 2010145584 A | 7/2010 |
| JP | 2011043703 A | 3/2011 |

OTHER PUBLICATIONS

International Search Report and Written Opinion mailed Mar. 18, 2014 in PCT/EP2013/070064, 12 pages.

* cited by examiner

*Primary Examiner* — Alan Cariaso
(74) *Attorney, Agent, or Firm* — Kilpatrick Townsend & Stockton LLP

(57) ABSTRACT

Embodiments of the present invention provide apparatuses and systems for providing illumination for projectors. Two or more sets of reflectors are used to combine light beams emitted by two or more two-dimensional arrays of light sources to provide a combined light beam with high brightness toward a pupil of a projection system. Solid state light sources, such as diode lasers and LEDs, may be used as light sources at relatively low cost and low powers, and with long lifetime.

20 Claims, 10 Drawing Sheets

ILLUMINATION DEVICES USING ARRAY OF REFLECTORS

BACKGROUND

Most high brightness projectors available now use either Xenon lamps or ultra high performance (UHP) Mercury arc lamps. High-wattage Xenon lamps are often used in projectors for digital cinema, large venues, and for fixed installations. Such projectors typically use Xenon lamps with wattage range of 2-6 kW, and have brightness in the range of 10,000-30,000 lumens. High-wattage Xenon lamps have relatively short lifetime, typically in the range of 500-1000 hours. UHP Mercury arc lamps are often used in compact and portable projectors for home or office use. Such projectors typically use UHP Mercury arc lamps with wattage range of 120-350 W, and have brightness in the range of 1000-5000 lumens. UHP Mercury arc lamps have a typical lifetime of about 2000 hours, which is still relatively short.

Therefore, it is desirable to have projectors that utilize light sources with much longer lifetimes while still providing suitable brightness.

BRIEF SUMMARY

Embodiments of the present invention provide apparatuses and systems for providing illumination for projectors. Two or more sets of reflectors are used to combine light beams emitted by two or more two-dimensional arrays of light sources to provide a combined light beam with high brightness toward a pupil of a projection system. Solid state light sources, such as diode lasers and LEDs, may be used as light sources at relatively low cost and low powers, and with long lifetime.

In one embodiment, an optical system for providing illumination to a pupil of an imaging device is provided. The optical system comprises a first two-dimensional array of first light sources disposed in rows and columns, and a second two-dimensional array of second light sources disposed in rows and columns. The second light sources are interleaved with the first light sources in both the column direction and the row direction. The optical system further comprises a first set of first reflectors and a second set of second reflectors. The first set of first reflectors is disposed as a staggered array such that each first reflector is operable to reflect first light beams provided by a respective row of first light sources toward the pupil of the imaging device. The second set of second reflectors is disposed as a staggered array such that each second reflector is operable to reflect second light beams provided by a respective row of second light sources toward the pupil of the imaging device. Each second reflector is stacked in front of a corresponding first reflector in the direction toward the pupil, and comprises transparent regions operable to transmit the first light beams reflected by a corresponding first reflector.

DETAILED DESCRIPTION

Most high brightness projectors available now use either Xenon lamps or UHP Mercury arc lamps. High-wattage Xenon lamps and UHP Mercury arc lamps, however, have relatively short lifetime. Therefore, it is desirable to have projectors that utilize light sources with much longer lifetimes while still providing suitable brightness. Embodiments of the present invention can provide apparatuses and systems for providing illumination for projectors with suitable brightness using lasers or other long lifetime light sources. For example, two or more sets of reflectors are used to combine light beams emitted by two or more two-dimensional arrays of light sources to provide a combined light beam with high brightness toward a pupil of a projection system. Solid state light sources, such as diode lasers and LEDs, may be used as light sources at relatively low cost and low power, and with long lifetime.

Figure 1:
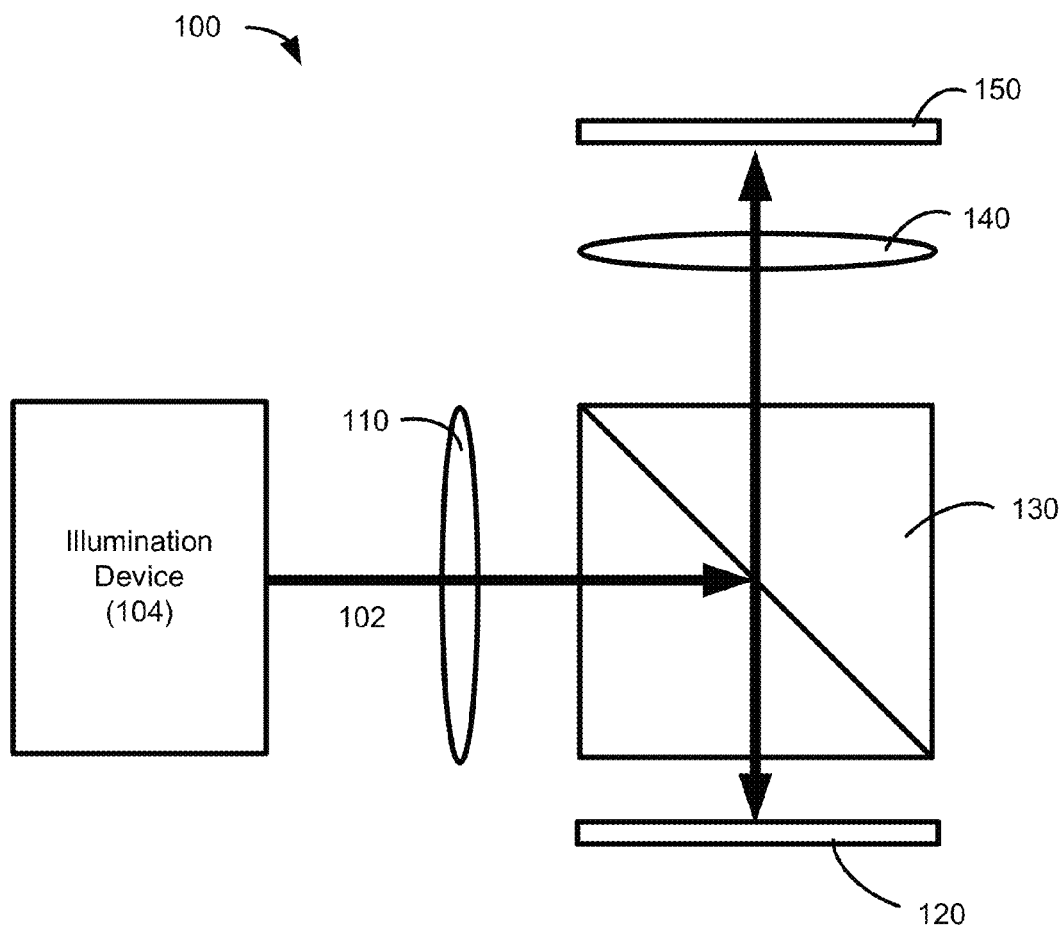
FIG. 1 is a cross sectional view of a simplified schematic diagram of a projection system.

FIG. 1 is a cross sectional view of a simplified schematic diagram of a projection system 100 that may utilize embodiments of the present invention. Light 102 (represented by a thick arrow) provided by an illumination device 104 proceeds through a condenser lens 110 and a total internal reflection (TIR) prism 130, and is focused onto an imager 120, where the light rays are converted into video information. The imager 120 may comprise, for example, a digital micromirror device (DMD), a liquid crystal light valve, or the like, which modulates the amplitude of the light rays in various spatial regions corresponding to various pixels of an image. The modulated light rays then pass through a projection lens 140 to form an enlarged image at a display device 150. The display device 150 may comprise, for example, a wall, a screen, or the like. Embodiments of the present invention, as will be described in more detail below, provide illumination devices for providing illumination to projection systems, such as the one shown in FIG. 1.

Figure 2A:
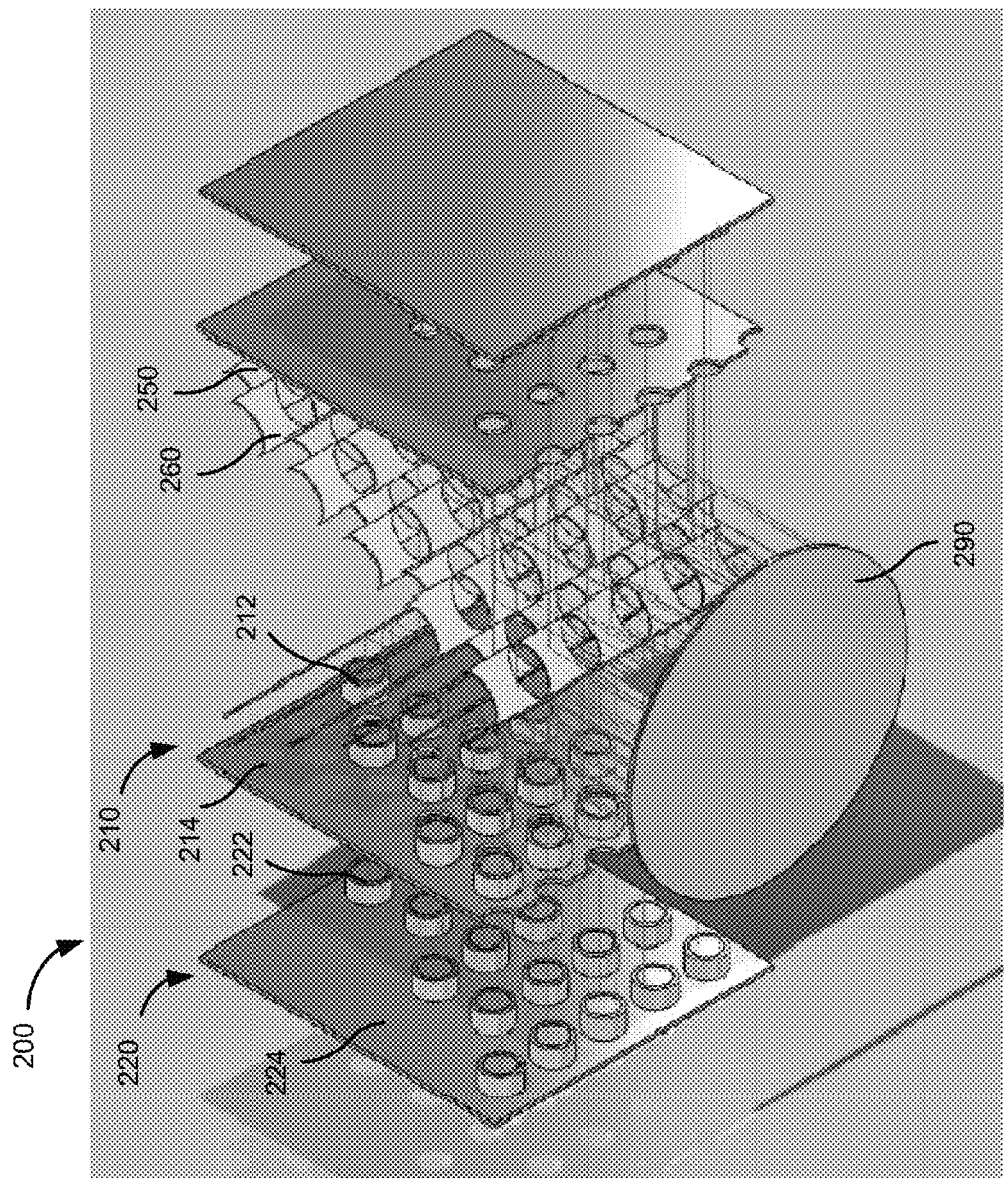
FIG. 2A is a partial perspective view of a simplified schematic diagram of an optical system according to an embodiment of the invention.

FIG. 2A is a partial perspective view of a simplified schematic diagram of an optical system 200 according to an embodiment of the invention. The optical system 200 includes a first two-dimensional array 210 of light sources, a second two-dimensional array 220 of light sources 220, a set of first reflectors 250, and a set of second reflectors 260. The first two-dimensional array 210 of light sources comprises a plurality of first light sources 212 disposed on a first plate 214. The second two-dimensional array 220 of light sources comprises a plurality of second light sources 222 disposed on a second plate 224.

Figure 2B:
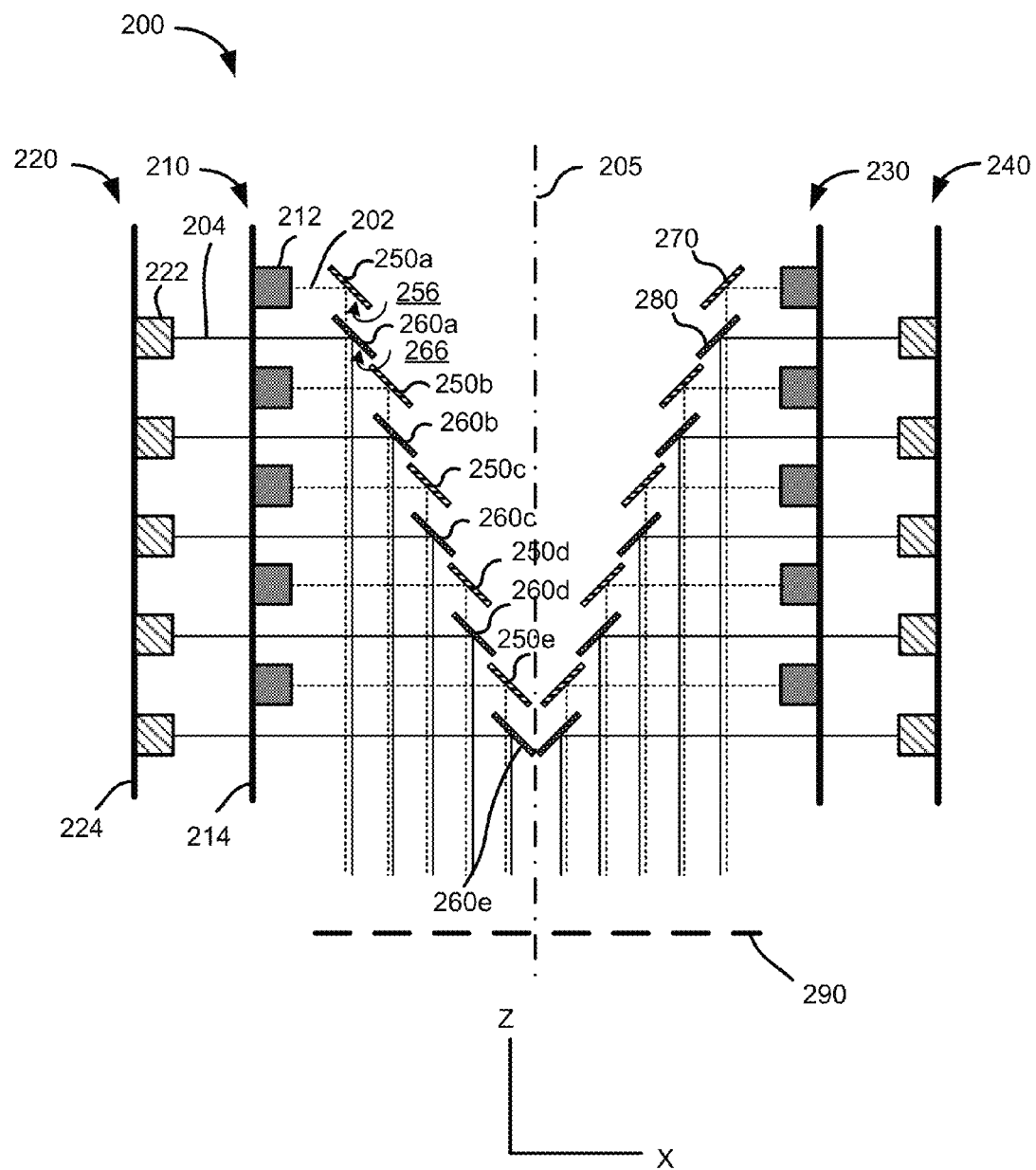
FIG. 2B is a cross sectional view of a simplified schematic diagram of the optical system shown in FIG. 2A, along with schematic ray diagrams.

FIG. 2B is a cross sectional view of a simplified schematic diagram of the optical system 200 shown in FIG. 2A, along with schematic ray diagrams. As shown, each first light source 212 is operable to emit a first light beam 202 (denoted by a dotted line) in a direction (e.g., the +x direction) perpendicular to the first plate 214. Each second light source 222 is operable to emit a second light beam 204 (denoted by a thin solid line) in a direction (e.g., the +x direction) perpendicular to the second plate 224. In one embodiment, each first light source 212 or second light source 222 comprises a solid state light-emitting device, such as a diode laser, an LED, or the like. Each first light source 212 or second light source 222 may be operable to provide a collimated light beam or non-collimated light beam according to various embodiments.

Figure 3A:
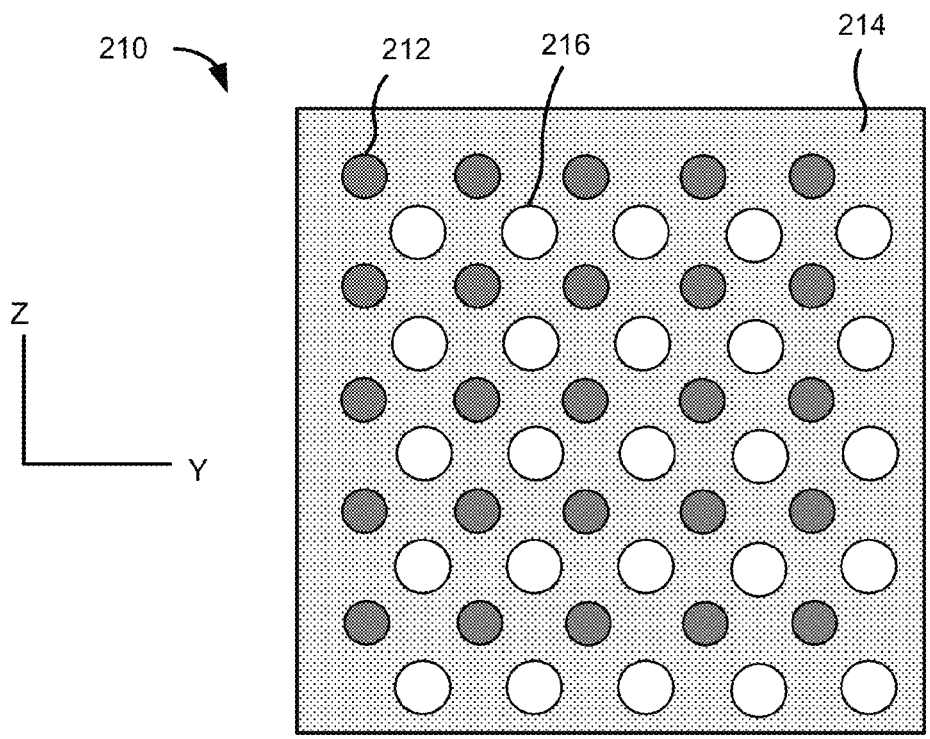
FIG. 3A is a plan view of a simplified schematic diagram of a two-dimensional array of light sources usable in the optical system shown in FIGS. 2A and 2B, according to an embodiment of the invention.

FIG. 3A is a plan view of a simplified schematic diagram of the first two-dimensional array 210 of light sources according to an embodiment of the invention. The first two-dimensional array 210 of light sources comprises a plurality of rows formed of first light sources 212 disposed in a row direction (e.g., the y direction, which is perpendicular to the paper of FIG. 2B), and a plurality of columns formed of first light sources 212 disposed in a column direction (e.g., the z direction). The first two-dimensional array of light sources is disposed on the first plate 214.

As shown in FIG. 3A, the first plate 214 comprises an array of transparent regions 216. The transparent regions 216 are interleaved with the first light sources 212 in both the row direction and the column direction. Each transparent region 216 may comprise a hole or a transparent material.

Figure 3B:
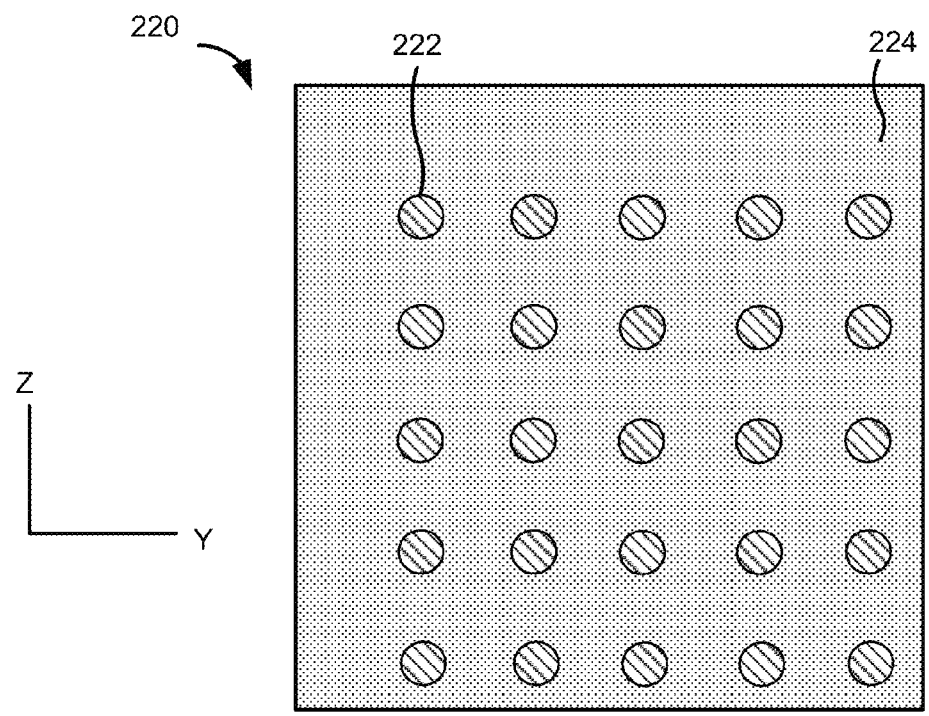
FIG. 3B is a plan view of a simplified schematic diagram of another two-dimensional array of light sources usable in the optical system shown in FIGS. 2A and 2B, according to an embodiment of the invention.

FIG. 3B is a plan view of a simplified schematic diagram of the second two-dimensional array 220 of light sources according to an embodiment of the invention. The second two-dimensional array 220 of light sources comprises a plurality of rows formed of second light sources 222 disposed in a row direction (e.g., the y direction), and a plurality of columns formed of second light sources 222 disposed in a column direction (e.g., the z direction). The second two-dimensional array 220 of light sources is disposed on the second plate 224 in the same spatial pattern as that of the array of transparent regions 216 on the first plate 214.

As shown in FIG. 2B, the second two-dimensional array 220 of light sources is positioned behind the first two-dimensional array 210 of light sources in the +x direction. The first plate 214 and the second plate 224 are properly aligned with respect to each other, so that the second light sources 222 on the second plate 224 are directly behind the transparent regions 216 on the first plate 214 in the +x direction. In this manner, the transparent regions 216 in the first plate 214 are operable to transmit the second light beams 204 emitted by the second light sources 222.

As shown in FIG. 2B, the set of first reflectors 250a-e is disposed as an array in the x direction and is staggered in the z direction, such that the z coordinate of each first reflector 250 is approximately the same as that of a corresponding row of first light sources 212.

Figure 4A:
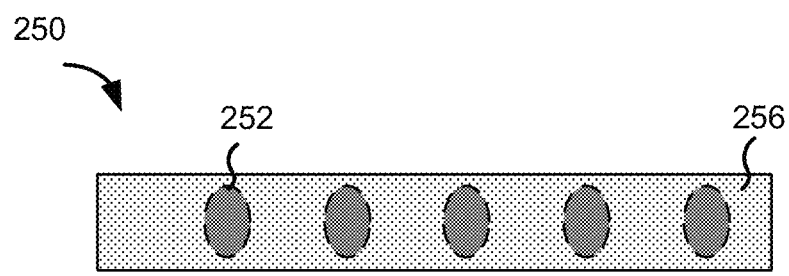
FIG. 4A is a plan view of a simplified schematic diagram of a reflector usable in the optical system shown in FIGS. 2A and 2B, according to an embodiment of the invention.

FIG. 4A is a plan view of a simplified schematic diagram of a first reflector 250 according to an embodiment of the invention. The first reflector 250 comprises a reflective surface 256 in the shape of a rectangle elongated in the y direction (which is perpendicular to the paper of FIG. 2B). It should be appreciated that the reflective surface 256 of the first reflector 250 may be characterized by other shapes in some embodiments. In one embodiment, the first reflector 250 comprises a thin metal strip. In other embodiments, the first reflector 250 comprises a dielectric plate or prism, with the reflective surface 256 being metallized with visible-light enhanced aluminum deposition, cold-mirror deposition, or other types of high-reflection coating suitable for the purposes.

As shown in FIG. 2B, each first reflector 250 is positioned such that a normal of the reflective surface 256 of each first reflector 250 is in the x-z plane and is tilted at an angle with respect to the x direction. As such, each first reflector 250 is operable to reflect the first light beams 202 emitted by a respective row of first light sources 212 into a direction (e.g., the −z direction) toward a pupil 290 of an imaging device. The shaded oval circles 252 in FIG. 4A indicate the footprints of the first light beams 202 emitted by a row of first light sources 212 when the first light beams 202 imping upon a corresponding first reflector 250. In one embodiment, the angle between the normal of the reflective surface 256 of each first reflector 250 and the x-axis is approximately 45 degrees. In this case, the first light beams 202 are incident on each first reflector at approximately 45-degree angle of incidence. In other embodiments, the angle between the normal of the reflective surface 256 of each first reflector 250 and the x-axis is different from 45 degrees.

As shown in FIG. 2B, the set of second reflectors 260a-e is also disposed as an array in the x direction. The set of second reflectors 260a-e is staggered and disposed in front of the set of first reflectors 250a-e in the z direction, such that z coordinate of each second reflector 260 is approximately the same as that of a corresponding row of second light sources 222.

Figure 4B:
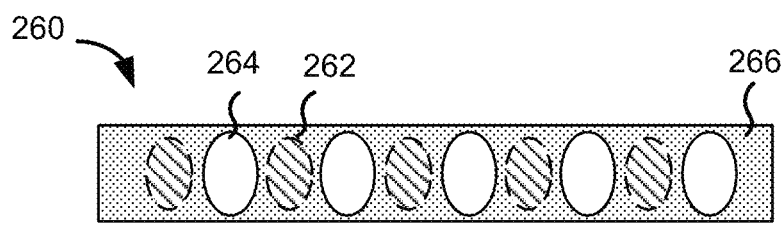
FIG. 4B a plan view of a simplified schematic diagram of another reflector usable in the optical system shown in FIGS. 2A and 2B, according to an embodiment of the invention.

FIG. 4B is a plan view of a simplified schematic diagram of a second reflector 260 according to an embodiment of the invention. The second reflector 260 comprises a reflective surface 266 in the shape of a rectangle elongated in the y direction (which is perpendicular to the paper of FIG. 2B). It should be appreciated that the reflective surface 266 of the second reflector 260 may be characterized by other shapes in some embodiments. In one embodiment, the second reflector 260 comprises a thin metal strip. In other embodiments, the second reflector 260 comprises a dielectric plate or prism, with the reflective surface 266 being metallized with visible-light enhanced aluminum deposition, cold-mirror deposition, or other types of high-reflection coating suitable for the purposes.

As shown in FIG. 2B, each second reflector 260 is positioned such that a normal of the reflective surface 266 of each second reflector 260 is in the x-z plane and is tilted at an angle with respect to the x direction. As such, each second reflector 260 is operable to reflect the second light beams 204 emitted by a respective row of second light sources 222 into a direction (e.g., the −z direction) toward the pupil 290 of the imaging device. The hatched oval circles 262 in FIG. 4B indicate the footprints of the second light beams 204 emitted by a row of second light sources 222 when the second light beams 204 impinge upon a corresponding second reflector 260. In one embodiment, the angle between the normal of the reflective surface 266 of each second reflector 260 and the x direction is approximately 45 degrees. In this case, the second light beams 204 are incident on each second reflector 260 at approximately 45-degree angle of incidence. In other embodiments, the angle between the normal of the reflective surface 266 of each second reflector 260 and the x direction is different from 45 degrees.

As shown in FIG. 4B, the second reflector 260 comprises a plurality of transparent regions 264 disposed as an array in the y direction (which is perpendicular to the paper of FIG. 2B) in the spaces between adjacent footprints 262 of the second light beams 204. Each transparent region 264 may comprise a hole or a transparent material. When each second reflector 260 is properly aligned with respect to a corresponding first reflector 250 in the y direction, the transparent regions 264 of each second reflector 260 are operable to transmit the first light beams 202 reflected by the corresponding first reflector 250.

In the manner described above, the set of first reflectors 250 and the set of second reflectors 260 are operable to combine the first light beams 202 emitted by the first light sources 212 and the second light beams 204 emitted by the second light sources into a combined light beam in the direction (e.g., the −z direction) toward the pupil 290.

Figure 5A:
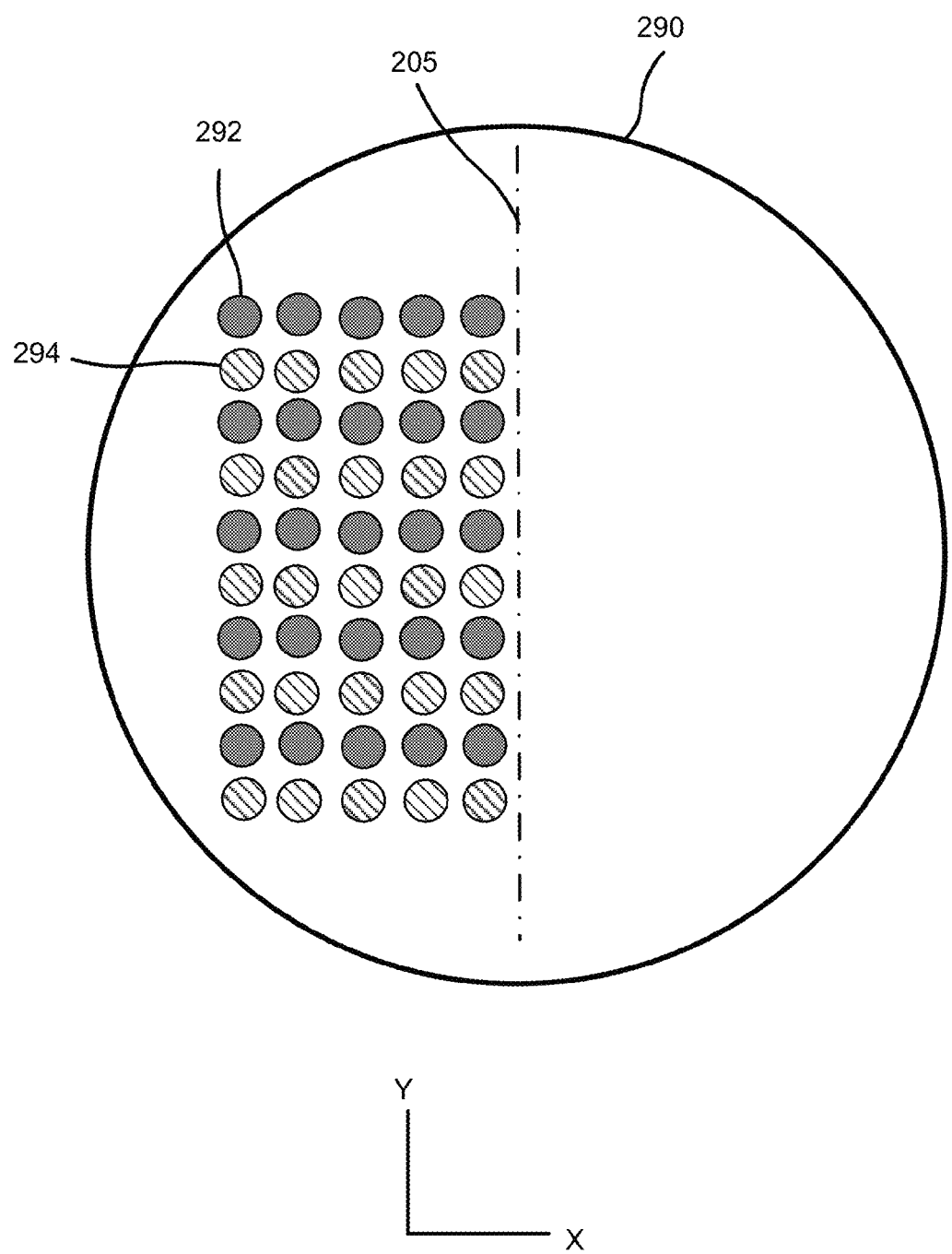
FIG. 5A is a plan view of a pupil of an imaging device according to an embodiment of the invention.

FIG. 5A is a plan view of a pupil 290 of an imaging device when it is illuminated by the combined light beam provided by the optical system 200, according to an embodiment of the invention. The shaded circles 292 indicate the footprints of the first light beams 202 emitted by the first light sources 212 when they impinge on the pupil 290. The hatched circles 294 indicate the footprints of the second light beams 204 emitted by the second light sources 222 when they impinge on the pupil 290. It can be seen that, the first light beams 202 emitted by each row of first light sources 212 and the second light beams 204 emitted by a corresponding row of second light sources 222 are mapped into a single column of light beams (in the y direction in FIG. 5A) when they impinge on the pupil 290. Furthermore, adjacent columns of light beams in the combined light beam are closely spaced with respect to each other, such that the first light beams 202 and the second light beams 204 are compressed into a combined light beam that fills only half side of the pupil 290.

As described above, the optical system 200 affords several advantages. First, the first light sources 212 and the second light sources 222 may be arranged on the first plate 214 and the second plate 224, respectively, with relatively large spacings between adjacent rows and columns, while still achieving a compact combined light beam. A relatively sparse arrangement of the light sources on each plate would allow better heat dissipation, thereby improving performance. Second, since each light source 212 or 222 may have fixtures that occupy a peripheral area around the light-emitting area of the light source, there may be a physical limit to how compact the light sources 212 or 222 can be arranged in an array. Therefore, the optical system 200 can afford a more compact combined light beam than what could be afforded by a single reflector. Third, by having the first light sources 212 mounted on one plate and the second light sources 222 mounted on another plate, the heat load on each plate is further reduced.

Figure 5B:
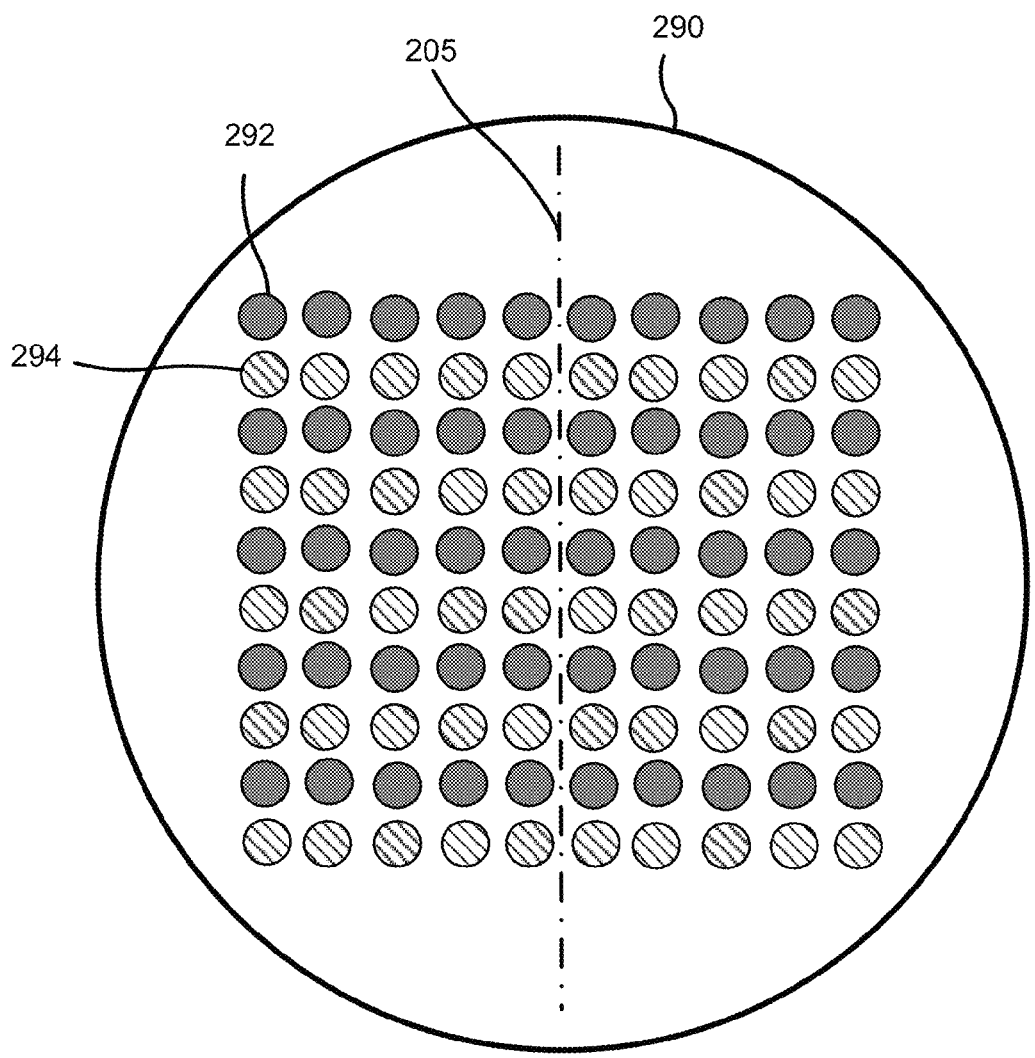
FIG. 5B is a plan view of a pupil of an imaging device according to another embodiment of the invention.

As shown in FIG. 2B, in one embodiment, the optical system 200 further comprises a third two-dimensional array 230 of light sources, a fourth two-dimensional array 240 of light sources, a set of third reflectors 270, and a set of fourth reflectors 280. The set of third reflectors 270 and the set of fourth reflectors 280 are mirror images of the set of first reflectors 250 and the set of second reflectors 260, respectively, with respect to a y-z plane 205 (which is perpendicular to the paper of FIG. 2B) that intersects the pupil 290 at approximately a middle line thereof. Similarly, the third two-dimensional array 230 of light sources and the fourth two-dimensional array 240 of light sources are mirror images of the first two-dimensional array 210 of light sources and the second two-dimensional array 220 of light sources, respectively, with respect to the same y-z plane 205. Arranged in this manner, the set of third reflectors 270 and the set of fourth reflectors 280 are operable to combine the light beams emitted by the third two-dimensional array 230 of light sources and the fourth two-dimensional array 240 of light sources to form a second combined light beam that would fill the other half side of the pupil 290, as shown in FIG. 5B.

The optical system 200 may be viewed as comprising two sub-devices that are mirror images of each other: a first sub-device comprising the first two-dimensional array 210 of light sources, the second two-dimensional array 220 of light sources, the set of first reflectors 250, and the set of second reflectors 260, and a second sub-device comprising the third two-dimensional array 230 of light sources, the fourth two-dimensional array 240 of light sources, the set of third reflectors 270, and the set of fourth reflectors 280.

In the manner described above, the optical system 200 may be used to provides a scalable illumination device for a projection system. Such an illumination device is scalable in the sense that higher brightness may be achieved by increasing the number of light sources in each of the four arrays 210, 220, 230, and 240 of light sources. Therefore, a high-brightness illumination device may be achieved. Such an illumination device has the advantage that four arrays 210, 220, 230, and 240 of light sources mounted on four separate plates are used to provide a combined light beam toward a pupil of an imaging device. As such, the heat load on each plate may be more manageable compared to the case where all light sources are mounted on a single plate. Furthermore, as discussed above, a more compact combined light beam may be achieved than what could be achievable otherwise.

Figure 5C:
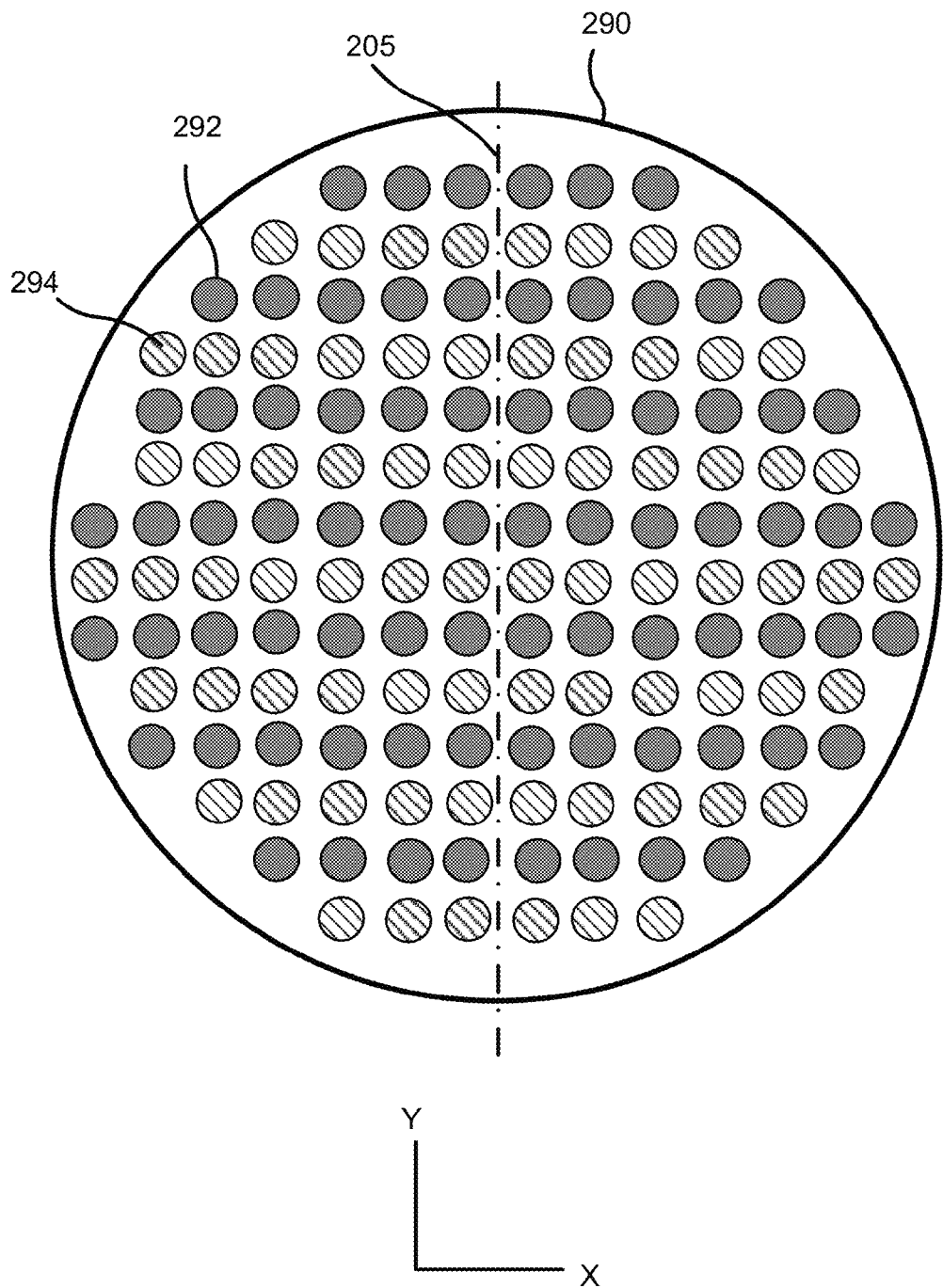
FIG. 5C is a plan view of a pupil of an imaging device according to a further embodiment of the invention.

According to some embodiments, each of the four arrays 210, 220, 230, and 240 of light sources may be configured such that an outer periphery of the footprints of the combined light beam matches closely to the shape of the pupil 290, as illustrated in the example shown in FIG. 5C. Here, the four arrays 210, 220, 230, and 240 of light sources are configured such that the outer periphery the footprints of the combined light beam matches closely the circular shape of the pupil 290. In this manner, the potential waste of light that may fall outside the pupil 290 is avoided. Conversely, under-filling of the pupil 290 may also be avoided. In a similar fashion, the four arrays 210, 220, 230, and 240 of light sources may be configured for other pupil shapes, such as square, rectangle, triangle, and the like.

Figure 6:
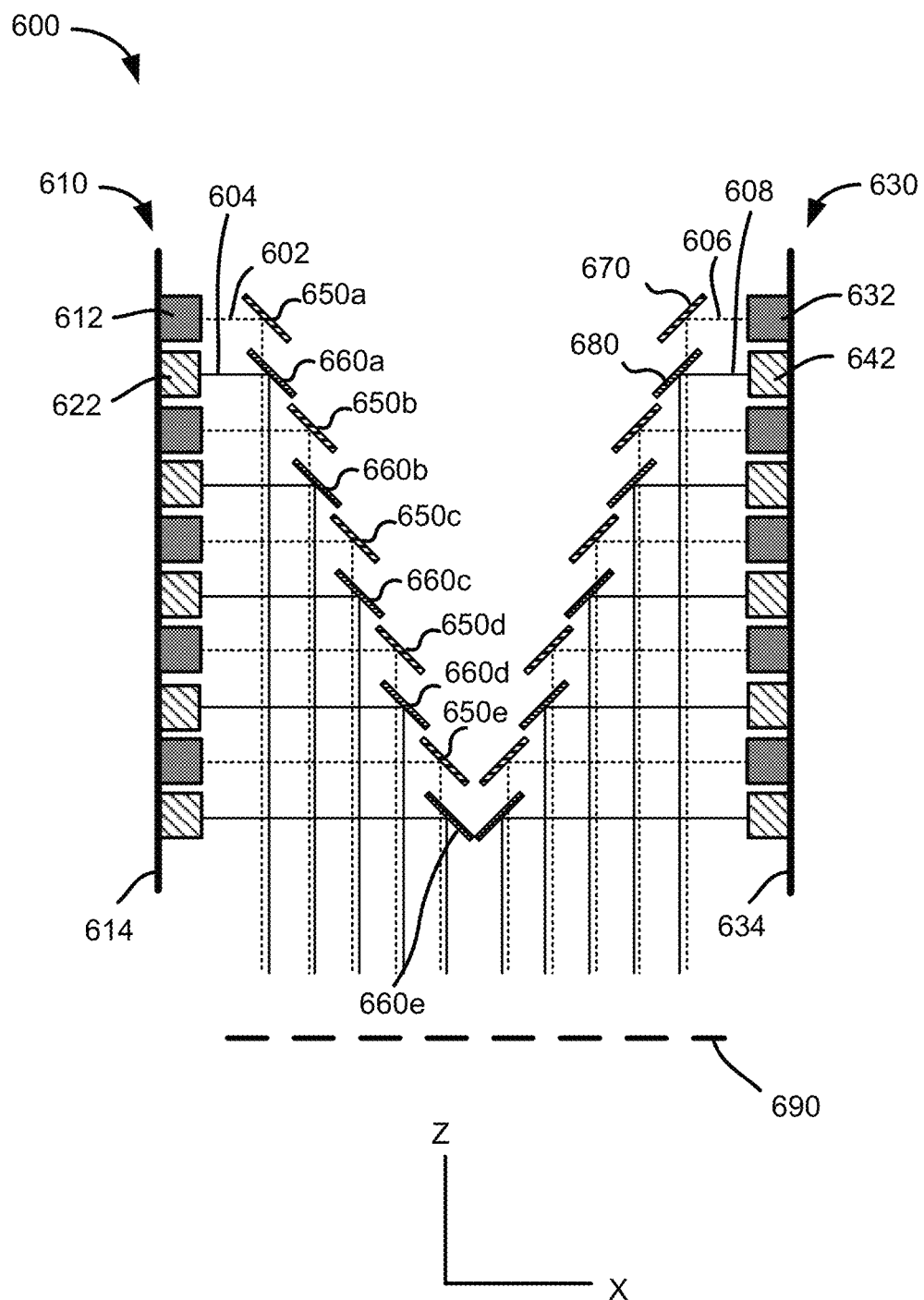
FIG. 6 is a cross sectional view of a simplified schematic diagram of an optical system, along with schematic ray diagrams, according to another embodiment of the invention.

FIG. 6 is a cross sectional view of a simplified schematic diagram of an optical system 600, along with schematic ray diagrams, according to another embodiment of the invention. The optical system 600 is similar to the optical system 200 shown in FIGS. 2A and 2B, except that the first array of first light sources 612 and the second array of second light sources 622 are mounted on the same plate 614 as a first illumination source 610. Similarly, the third array of third light sources 632 and the fourth array of fourth light sources 642 are mounted on the same plate 634 as a second illumination source 630. The optical system also comprises a set of first reflectors 650, a set of second reflectors 660, a set of third reflectors 670, and a set of fourth reflectors 680, arranged in the same manner as in the optical system 200 shown in FIGS. 2A and 2B.

Figure 7:
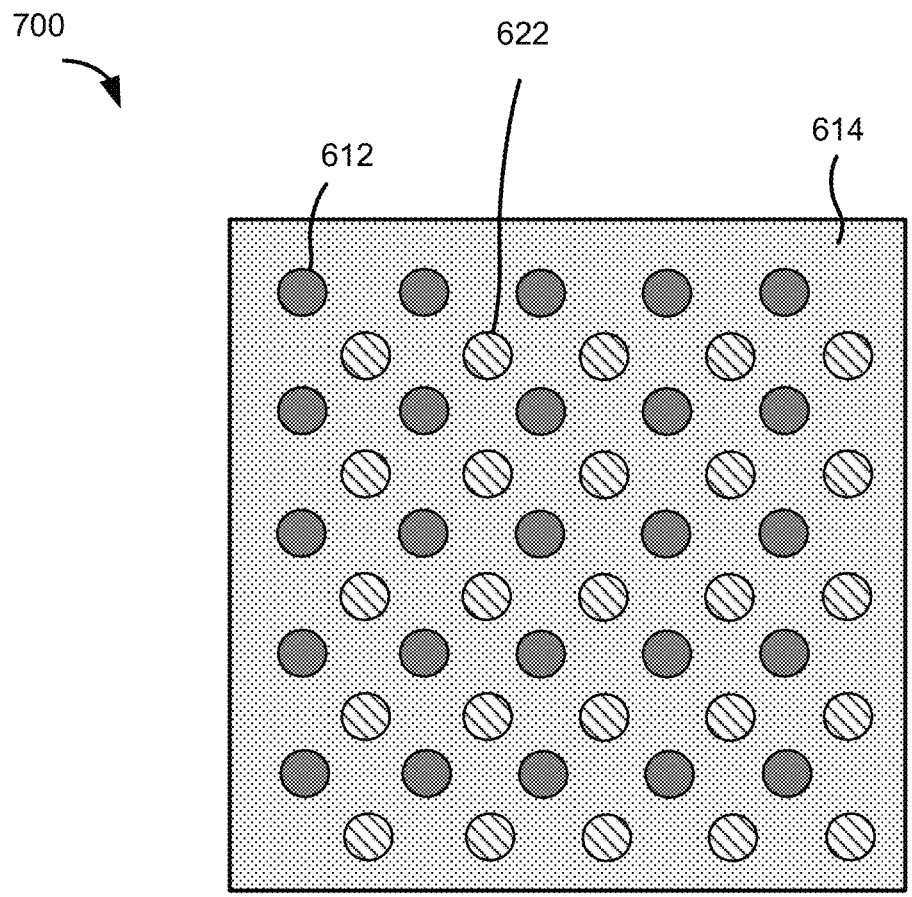
FIG. 7 is a plan view of a simplified schematic diagram of an illumination source usable in the optical system shown in FIG. 6, according to an embodiment of the invention.

FIG. 7 is a plan view of a simplified schematic diagram of an illumination source 700 according to an embodiment of the invention, which may be used as the first illumination source 610 and the second illumination source 630. The illumination source 700 comprises a first array of first light sources 612 (represented by the dark shaded circles) disposed in rows and columns. The illumination source 700 also comprises a second array of second light sources 622 (represented by the hatched circles) disposed in rows and columns. The first light sources 612 are interleaved with the second light sources 622 in both the row direction (e.g., the y direction) and the column direction (e.g., the z direction).

In the same manner as in the optical system 200 shown in FIGS. 2A and 2B, the set of first reflectors 650, the set of the second reflectors 660, the set of third reflectors 670, and the set of fourth reflectors 680 are operable to combine the first light beams 602, the second light beams 604, the third light beams 606, and the fourth light beams 608 emitted by the first light sources 612, the second light sources 622, the third light sources 632, and the fourth light sources 642, respectively, to form a combined light beam toward a pupil 690 of an imaging device.

Compared to the optical system 200 shown in FIGS. 2A and 2B, the optical system 600 can be less complex. For example, because the first array of first light sources 612 and the second array of second light sources 622 (or the array of third light sources 632 and the array of fourth light sources 642) are mounted on a single plate instead of two separate plates, no alignment between two plates is necessary. However, the simplicity is achieved at the expense of having higher heat load on the single plate. Also, because the first light sources 612 and the second light sources 622 are interleaved on a single plate, the spacings between adjacent light sources are smaller compared to the case in the optical system 200 where the first light sources 212 and the second light sources 222 are mounted on two separate plates as shown in FIGS. 3A and 3B. Since each light source may have fixtures that occupy a peripheral area around the light-emitting area of the light source, there may be a physical limit as how compact the light sources can be arranged on the plate.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An optical system for providing illumination to a pupil of an imaging device, the optical system comprising:
   a first two-dimensional array of first light sources comprising:
      a plurality of first rows formed of the first light sources disposed in a first direction; and
      a plurality of first columns formed of the first light sources disposed in a second direction orthogonal to the first direction,
      wherein each first light source is operable to provide a first light beam propagating in a third direction orthogonal to the first direction and the second direction;
   a second two-dimensional array of second light sources comprising:
      a plurality of second rows formed of the second light sources disposed in the first direction; and
      a plurality of second columns formed of the second light sources disposed in the second direction,
      wherein each second light source is operable to provide a second light beam propagating in the third direction,
      wherein the second rows of second light sources are interleaved with the first rows of first light sources in the second direction, and the second columns of second light sources are interleaved with the first columns of first light sources in the first direction, and
   wherein the third direction is a specific direction along an axis;
   a first set of first reflectors disposed as an array in the third direction and staggered in the second direction, such that each first reflector is operable to reflect first light beams provided by a respective first row of first light sources into the second direction toward the pupil; and
   a second set of second reflectors disposed as an array in the third direction and staggered in the second direction, such that each second reflector is operable to reflect second light beams provided by a respective second row of second light sources into the second direction toward the pupil,
   wherein each second reflector is stacked in front of a corresponding first reflector in the second direction toward the pupil, and each second reflector comprises transparent regions operable to transmit the first light beams reflected by a corresponding first reflector, and
   wherein the first two-dimensional array of first light sources and the second two-dimension array of light sources are both disposed on a same side of the first set of first reflectors and the second set of second reflectors.

2. The optical system of claim 1, wherein each first light source is operable to provide a collimated light beam, and each second light source is operable to provide a collimated light beam.

3. The optical system of claim 1, wherein each transparent region on each second reflector comprises a hole or a transparent material.

4. The optical system of claim 1, wherein each respective first reflector is positioned such that the first light beams provided by a corresponding first row of first light sources are incident on the respective first reflector at an approximately 45-degree angle of incidence, and each respective second reflector is positioned such that the second light beams provided by a corresponding second row of second light sources are incident on the respective second reflector at an approximately 45-degree angle of incidence.

5. The optical system of claim 1, wherein:
   the first two-dimensional array of first light sources is mounted on a first plate; and
   the second two-dimensional array of second light sources is mounted on a second plate,
   wherein the first plate is disposed in front of the second plate in the third direction, and the first plate comprises transparent regions operable to transmit the second light beams provided by the second light sources.

6. The optical system of claim 5, wherein each transparent region on the first plate comprises a hole or a transparent material.

7. The optical system of claim 1, wherein the first two-dimensional array of first light sources and the second two-dimensional array of second light sources are mounted on a plate.

8. The optical system of claim 1 further comprising:
   a third two-dimensional array of third light sources comprising:
      a plurality of third rows formed of the third light sources disposed in the first direction; and
      a plurality of third columns formed of the third light sources disposed in the second direction,
      wherein each third light source is operable to provide a third light beam propagating in a fourth direction opposing the third direction;
   a fourth two-dimensional array of fourth light sources comprising:

a plurality of fourth rows formed of the fourth light sources disposed in the first direction; and a plurality of fourth columns formed of the fourth light sources disposed in the second direction, wherein each fourth light source is operable to provide a light beam propagating in the fourth direction, wherein the fourth rows of fourth light sources are interleaved with the third rows of third light sources in the second direction, and the fourth columns of fourth light sources are interleaved with the third columns of third light sources in the first direction;

a third set of third reflectors disposed as an array in the fourth direction and staggered in the second direction, such that each third reflector operable to reflect the third light beams provided by a respective third row of third light sources into the second direction toward the pupil; and a fourth set of fourth reflectors disposed as an array in the fourth direction and staggered in the second direction, such that each fourth reflector is operable to reflect the fourth light beams provided by a respective fourth row of fourth light sources into the second direction toward the pupil, wherein each fourth reflector is stacked in front of a corresponding third reflector in the second direction toward the pupil, and each fourth reflector comprises transparent regions operable to transmit the third light beams reflected by a corresponding third reflector.

9. The optical system of claim 8, wherein:

the first two-dimensional array of first light sources is mounted on a first plate;

the second two-dimensional array of second light sources is mounted on a second plate, wherein the first plate is disposed in front of the second plate in the third direction, and the first plate comprises first transparent regions operable to transmit the second light beams provided by the second light sources;

the third two-dimensional array of third light sources is mounted on a third plate; and the fourth two-dimensional array of fourth light sources is mounted on a fourth plate, wherein the third plate is disposed in front of the fourth plate in the fourth direction, and the third plate comprises second transparent regions operable to transmit the fourth light beams provided by the fourth light sources.

10. The optical system of claim 8, wherein:

the first two-dimensional array of first light sources and the second two-dimensional array of second light sources are mounted on a first plate; and the third two-dimensional array of third light sources and the fourth two-dimensional array of fourth light sources are mounted on a second plate.

11. An optical system for providing illumination to a pupil of an imaging device, the optical system comprising:

a first set of first reflectors disposed as an array in a first direction and staggered in a second direction toward the pupil, the second direction being orthogonal to the first direction, wherein each first reflector is operable to reflect one or more first light beams incident in the first direction into the second direction toward the pupil; and a second set of second reflectors disposed as an array in the first direction and staggered in the second direction toward the pupil, each second reflector comprising one or more transparent regions, wherein each second reflector is operable to reflect one or more second light beams incident in the first direction into the second direction toward the pupil, wherein the first direction is a specific direction along an axis, wherein the first light beams and the second light beams are incident from a same side for both the first set of first reflectors and the second set of second reflectors;

wherein each second reflector is stacked in front of a corresponding first reflector in the second direction toward the pupil, and each second reflector is operable to transmit the one or more first light beams reflected by the corresponding first reflector through the one or more transparent regions on the second reflector.

12. The optical system of claim 11, wherein each of the one or more first light beams comprises a collimated light beam, and each of the one or more second light beams comprises a collimated light beam.

13. The optical system of claim 11, wherein the one or more first light beams are incident on each first reflector at an approximately 45-degree angle of incidence, and the one or more second light beams are incident on each second reflector at an approximately 45-degree angle of incidence.

14. The optical system of claim 11, wherein each of the one or more transparent regions on each second reflector comprises a hole or a transparent material.

15. The optical system of claim 11 further comprising:

a first two-dimensional array of first light sources comprising a plurality of first rows, each first row comprising one or more first light sources disposed in a third direction, the third direction being orthogonal to the first direction and the second direction, wherein the one or more first light sources in each first row are operable to provide the one or more first light beams to be reflected by a corresponding first reflector; and a second two-dimensional array of second light sources comprising a plurality of second rows, each second row comprising one or more second light sources disposed in the third direction, wherein the one or more second light sources in each second row are operable to provide the one or more second light beams to be reflected by a corresponding second reflector.

16. The optical system of claim 15, wherein:

the first two-dimensional array of light sources is mounted on a first plate; and the second two-dimensional array of light sources is mounted on a second plate, wherein the first plate is disposed in front of the second plate in the first direction and comprises transparent regions operable to transmit the second light beams provided by the second light sources.

17. The optical system of claim 16, wherein each transparent region on the first plate comprises a hole or a transparent material.

18. The optical system of claim 15, wherein the first two-dimensional array of first light sources and the second two-dimensional array of second light sources are mounted on a plate.

19. An optical device comprising:

a first sub-device comprising the optical system of claim 15; and a second sub-device comprising a mirror image of the optical system of claim 15 with respect to a plane orthogonal to the first direction, wherein the second sub-device is positioned next to the first sub-device such that the first sub-device is operable to provide illumination to a first half of the pupil, and the second sub-device is operable to provide illumination to a second half of the pupil.

20. An optical device comprising:
a first sub-device comprising the optical system of claim 11; and
a second sub-device comprising a mirror image of the optical system of claim 11 with respect to a plane orthogonal to the first direction,
wherein the second sub-device is positioned next to the first sub-device such that the first sub-device is operable to provide illumination to a first half of the pupil, and the second sub-device is operable to provide illumination to a second half of the pupil.

* * * * *